United States Patent [19]

Mayes

[11] Patent Number: 5,186,206
[45] Date of Patent: Feb. 16, 1993

[54] CONTROL VALVE TRIM

[75] Inventor: M. Dale Mayes, Baton Rouge, La.

[73] Assignee: The Dow Chemical Company, Midland, Mich.

[21] Appl. No.: 796,491

[22] Filed: Nov. 22, 1991

[51] Int. Cl.[5] ............................................. F16K 1/38
[52] U.S. Cl. ................................. 137/244; 251/122
[58] Field of Search ............... 251/122, 121; 137/244

[56] References Cited

U.S. PATENT DOCUMENTS

| | | | |
|---|---|---|---|
| 1,729,802 | 10/1929 | Smith | 251/122 X |
| 1,911,905 | 5/1933 | Knowlton et al. | 251/122 X |
| 2,881,783 | 4/1959 | Andrews | 137/244 |
| 4,688,755 | 8/1987 | Pluviose | 251/122 X |

FOREIGN PATENT DOCUMENTS 0241586 11/1985 Japan ................................. 251/122

Primary Examiner—Arnold Rosenthal

[57] ABSTRACT

An improved control valve assembly that resists plugging by fluids contaminated with sticky solids, e.g. sludge or particulates, comprising a valve containing a modified valve trim having a stepped cross-section rather than a continuous taper created by reducing the diameter of the valve stem at a point on the stem corresponding to a position of 90 percent open, so that the modification causes the flow area to suddenly increase drastically when the valve opens to 90 percent open in response to flow falling below a predetermined setpoint.

5 Claims, 1 Drawing Sheet

CONTROL VALVE TRIM

BACKGROUND OF THE INVENTION

The present invention relates to control valve assemblies comprising a valve body with an inlet-end, an outlet-end, and a passageway therebetween, and a valve trim comprising a valve stem and a valve seat. The valve stem has a plug seat which during operation engages a valve seat forming a fluid-tight seal. More particularly the present invention relates to improved control valve assemblies suitable for use as flow or pressure control valves in particulate-laden or sticky fluid systems.

Control valve assemblies, particularly those with a flow coefficient $C_v$ as defined in the "Masoneilan Handbook for Control Valve Sizing" Sixth Edition (McGraw-Edison, Norwood, Mass.) 1977, less than 0.5, in processes involving particulate-laden fluids such as biological sludges and gases generated by the gasification of fossil fuels, have been known to plug to the extent that flow control is no longer possible causing the process or part of the process to be shut down or the plugged valve assembly to be isolated from the process to enable removal, cleaning, reinstallation, and return to process control function. This is a bothersome, uneconomical and time-consuming exercise that is a problem in such processes including the growing fields of biological waste treatment and coal gasification. To date, the only recourse has been to provide elaborate filtering systems upstream of the valve. This option is not desirable. According to the ISA Handbook of Control Valves, 1976, Second Edition, J. W. Hutchinson, Editor in Chief, Instrument Society of America, Pittsburg, Pa., smooth bore body designs with few dead ends are recommended under these conditions. While eliminating dead ends in the control valve assembly may slow down build up of foreign material, it does not solve the problem of particulates plugging the gap between the inner surface of a tapered valve seat and the outside surface of a tapered plug.

SUMMARY OF THE INVENTION

As plugging or fouling of the valve trim builds up in a control valve assembly used in processes involving particulate-laden systems, the valve position is changed in order to maintain a certain flow or pressure level. The present invention includes a valve trim modification in control valve assemblies wherein the flow coefficient $C_v$ suddenly and greatly increases and plugging or fouling material is passed through the trim after which the trim returns to a pre-set condition. This is accomplished by creating a stepped section in the typically tapered plug such that, at a certain value or percentage of the stroke, the much larger opening now created between the plug and the valve seat, allows large or agglomerated particles, which can block or plug a small opening such as in the case of a conventional tapered plug and valve seat arrangement, to pass through, thereby removing the blocking problem.

BRIEF DESCRIPTION OF THE DRAWINGS

FIG. 3 is a schematic view of a modified valve trim where the object of the invention, the stepped section on the tapered plug, has cleared the opening in the valve seat thereby creating a large volume flow or pressure increase to allow plugging materials to pass through.

DETAILED DESCRIPTION OF THE PREFERRED EMBODIMENTS

The use of control valve assemblies of the tapered plug and valve seat type, such as the Annin series 9460, is commonly known in the chemical process industry. Such valves have a tapered plug that is seatable in a tapered valve seat and the valve position is typically governed by predetermined flow or pressure values. In many processes involving fluid flow, these control valve assemblies perform their intended function of controlling fluid flow. However, in processes involving fluids that contain solid materials, which can for example be particulate or gelatinous in nature, the clearance between the outer surface of the tapered plug and the inside surface of the tapered valve seat may be smaller than the particle size of the solid materials in which case the valve position is changed to maintain a certain flow rate or pressure setting. As build up continues, there comes a time when the valve position is maximized and the flow can no longer be maintained at the predetermined rate. For such cases, the valve assembly is then normally isolated or removed from service and either cleaned or replaced.

Figure 1:
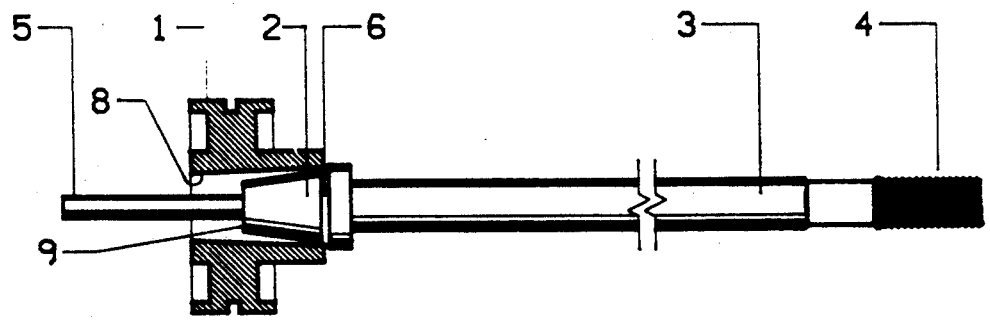
FIG. 1 is a schematic view of a modified valve trim in a fully closed position.
Figure 2:
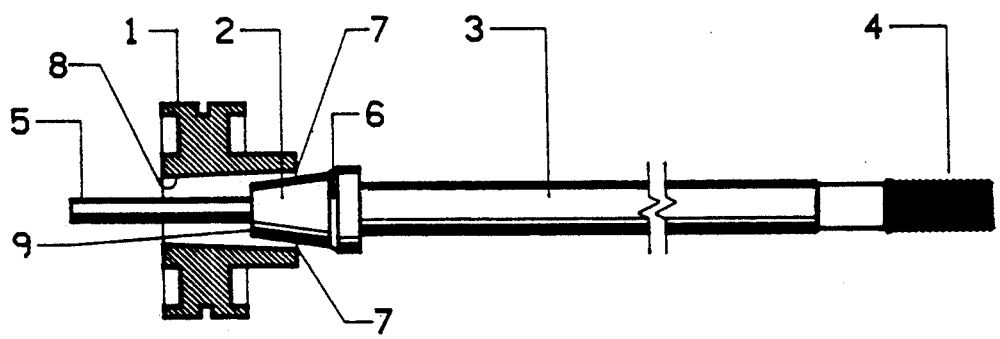
FIG. 2 is a schematic view of a modified valve trim in a partially open position.
Figure 3:
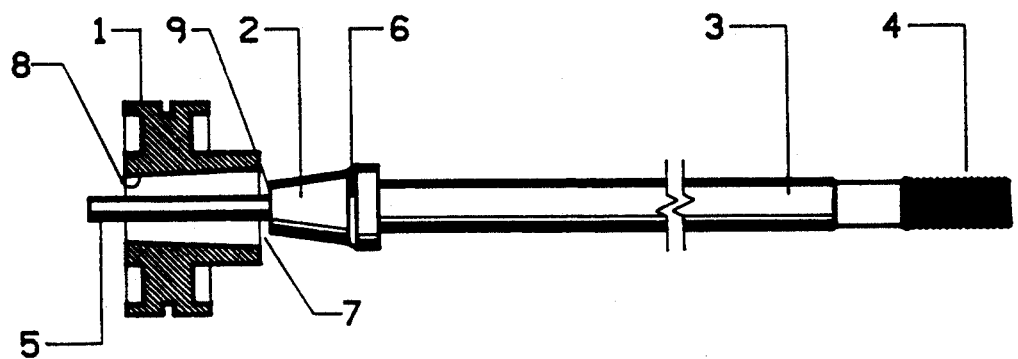

As shown in FIGS. 2 and 3, in a preferred embodiment of the invention, as particulate or gelatinous build up impinges on the structure surrounding clearance 7 between the outside surface 2 of the tapered plug 5, and the inside surface 8 of the valve seat 1, the valve stem 3, actuated by a flow control device, not shown in the drawing but connected to the valve stem 3 through the threaded end 4, is moved out of valve seat 1 such that the pre-set flow is maintained. In the closed position, plug shoulder 6 forms a fluid-tight seal with valve seat 1. As build up or plugging continues, the valve position changes so that the tapered plug 5 is further removed from valve seat 1 until the stepped section 9 of tapered plug 5 clears the valve seat 1. At this point, the control valve flow coefficient $C_v$, as defined for example in the, "Masoneilan Handbook for Control Valve Sizing," (cited previously) suddenly and drastically increases thereby creating an opening that is now larger than the particle size of the plugging material and allowing the plugging material to be flushed downstream position with respect to the valve assembly. The valve tapered plug 5 then returns to the pre-set condition for fluid flow or pressure control and the process continues without interruption. This invention thus allows the control valve assembly (the whole control valve assembly not shown) to operate unattended in a process and to operate in a self-cleaning mode. The angle of the stepped section relative to the tapered plug can be in the range of from about 60° to about 90° with the longitudinal axis of the valve stem 3, a more preferred embodiment having a range of from about 70° to about 90° and the most preferred embodiment having a range of from about 80° to about 90°.

In a most preferred embodiment of this invention, an Annin 9460 ½ inch control valve with a flow coefficient $C_v$ of 0.2, was used to control the flow of reactor effluent sludge in a biological oxidation pilot plant. The valve position gradually increased from 50% open to 100% open over a period of about four hours at which time the valve plugged totally and flow was stopped. After removing the valve and cleaning out the gelatinous particulate build up, and reinstalling the valve the operation was repeated. Adjustments of proportional and reset controls on the PID controllers were made to cause the valve to oscillate around the set point and while the plugging time increased to about 8 hours, the flow was stopped again. Thereafter, the valve plug was stepped in accord with this invention so that the stepped portion clears the seat at 7/16 inch of the total valve stroke of ½ inch and the valve was once again put back in service. The process unit was then operated continuously in excess of 200 hours without plugging. During the period of operation with the stepped control valve assembly, the stroke cleared the stepped section about 40 times and returned to the preset flow control position each time. This experiment was then concluded. Additional process experiments using this valve were conducted for periods ranging from 3 days to 14 days with no down time due to plugging of the stepped plug in the control valve assembly.

I claim:

1. In a control valve assembly of the type comprising a valve body with an inlet end, an outlet end, and a passageway therebetween, and a valve trim which comprises a valve stem and a valve seat positioned axially in said passageway wherein said valve stem has a plug seat and a tapered plug section downstream of said plug seat and said plug seat engages said valve seat forming a fluid tight seal in a closed position, the improvement comprising said valve stem having a stepped portion positioned alongside said tapered plug section such that a sudden enlargement for flow through said passageway occurs as said valve stem moves to an open position and as said stepped portion clears said valve seat to allow said valve assembly to be self-cleaning.

2. An improved control valve assembly as recited in claim 1 wherein said stepped portion forms an angle of from about 90° to about 60° with the longitudinal axis of said valve stem.

3. An improved control valve assembly as recited in claim 2 wherein said stepped portion resists plugging by fluids containing solids.

4. An improved control valve assembly as recited in claim 1 wherein said fluid is in the form of a biological sludge.

5. An improved control valve assembly as recited in claim 1 wherein said fluid is a particle-containing gaseous material.

* * * * *